Nov. 10, 1964 H. W. WRIGHT, JR., ETAL 3,156,643
TENSIONING MEANS FOR SEPARATOR SCREENS
Filed Jan. 22, 1962
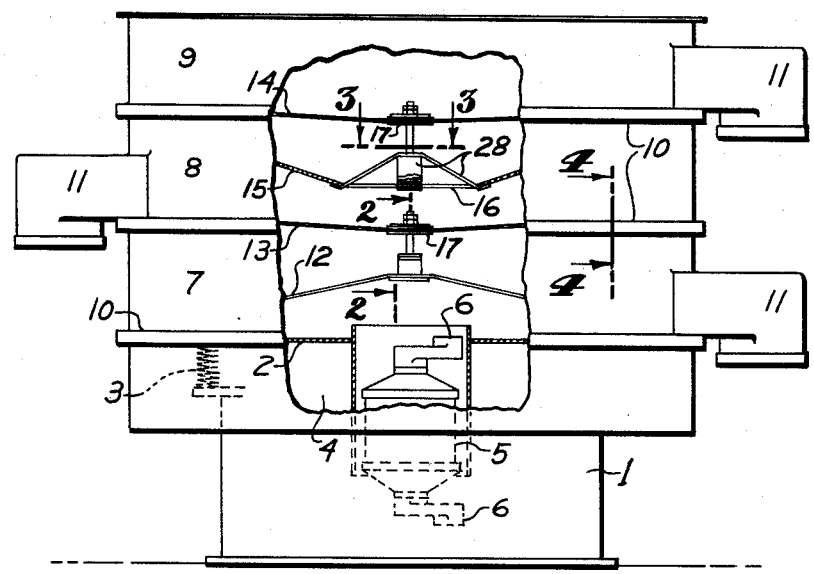
FIG. 1
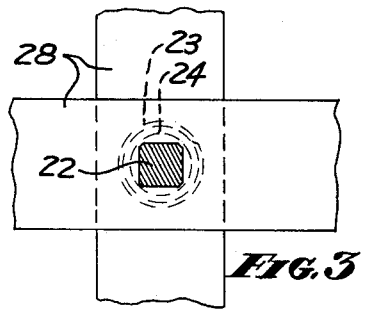
FIG. 4
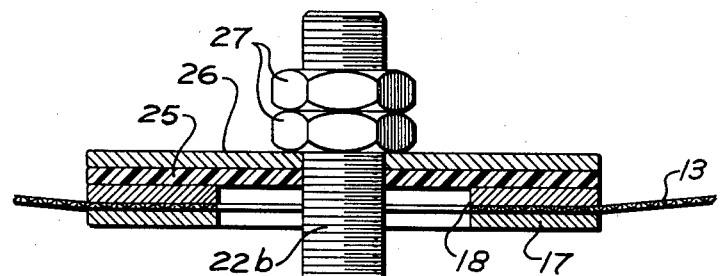
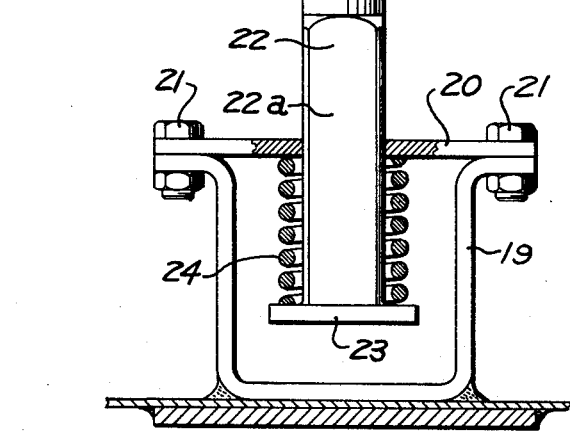
FIG. 3
FIG. 2
HOWARD W. WRIGHT JR
BILL A. RACINE
INVENTORS
BY Lyon & Lyon
ATTORNEYS

United States Patent Office 3,156,643
Patented Nov. 10, 1964

3,156,643
TENSIONING MEANS FOR SEPARATOR SCREENS
Howard W. Wright, Jr., San Gabriel, and Bill A. Racine, Hacienda Heights, Calif., assignors to Southwestern Engineering Company, Los Angeles, Calif., a corporation of California
Filed Jan. 22, 1962, Ser. No. 167,560
6 Claims. (Cl. 209—352)

This invention relates to tensioning means for separator screens; more particularly to tensioning means adapted for attachment to the centers of circular separator screens so as to maintain the screens under substantially constant tension under changing temperature conditions.

Included in the objects of this invention are:

First, to provide a tensioning means for separator screens utilizing a tensioning spring so located as to be free of material being screened without enclosing the spring in a sealed housing.

Second, to provide a tensioning means for separator screens which may be readily and quickly adjusted and which may be readily and quickly replaced.

Third, to provide a tensioning means for separator screens which includes a tensioning spring disposed below the screen and protected by an umbrella disk at the center of the screen against the fall of screened material thereon, and which also includes a tensioning bolt extending from the spring through the screen and so supported by the spring as to be freely displaced laterally should the center of the screen be laterally displaced, as may occur by uneven heating of the screen or relative shifting of the shells surrounding the machine should the clamps which join the shells become loosened.

With the above and other objects in view, as may appear hereinafter, reference is directed to the accompanying drawings in which:

FIGURE 1 is a side view of a separator embodying the tensioning means with a portion of the side wall of the separator broken away to show the tensioning means;

FIGURE 2 is an enlarged, partial sectional, partial elevational view of the tensioning means with the support therefor and a separator screen shown fragmentarily;

FIGURE 3 is a fragmentary, sectional view through 3—3 of FIGURE 1 showing the manner in which one of the tensioning means is mounted;

FIGURE 4 is a fragmentary, sectional view through 4—4 of FIGURE 1 illustrating one of the clamp means which joins sections of the separator and supports a separator screen.

The separators for which the tensioning means is particularly adapted includes a cylindrical base 1 which supports a bottom plate 2 by means of a plurality of springs 3 arranged in a ring. Suspended from the bottom plate 2 within the base 1 is a cylindrical motor housing 4 having a motor 5 therein. Eccentric weights 6 are provided at the extremities of the motor 5 for the purpose of vibrating the bottom plate 2 and the separator structure mounted thereon.

The bottom plate 2 supports a series of shells 7, 8, and 9 which are circular and have flanges at their axial ends. The shells are adapted to be secured together and to the bottom plate 2 by clamp rings 10. Each shell is provided with a discharge spout 11.

Interposed between the bottom shell 7 and the bottom plate 2 and held by means of the lowermost clamp ring 10 is a bottom partition 12 which is dome-shaped. That is, its walls slope upwardly toward the center of the partition so that material falling on the bottom partition 12 is deflected to the surrounding lowermost shell 7 and discharged from its spout 11.

A bottom screen 13 is interposed between the lowermost shell 7 and the next shell 8 above by means of the corresponding clamp ring 10. The screen 13 overlies the bottom partition 12. Clamped between the shell 8 and the shell 9 thereabove is an upper screen 14 and an upper partition 15, the upper partition being below the upper screen. The upper partition 15 slopes downwardly towards the central portion and is provided with a central opening 16.

The foregoing construction may be considered as conventional, and represents a typical separator having two screens. In practice there may be a single screen, or additional shells may be utilized and additional screens with corresponding partitions also added.

Each screen is provided with a central reinforcing ring 17 providing a central opening 18. In order to tension the bottom screen 13, there is secured to the center of the bottom partition 12, by any suitable means, a U-shaped mounting strap 19 across which is secured a mounting plate 20 by means of bolts 21.

A bolt 22 is provided having a lower shank portion 22a which is square in cross section and the upper shank portion 22b of which is round in cross section and screw-threaded. The lower or square shank portion 22a extends through a square hole in the mounting plate 20 and is provided with a head 23 at its lower end. A compression spring 24 is interposed between the head 23 and the mounting plate 20. The bolt 22 extends upwardly from the mounting plate 20 through the opening 18 in the central reinforcing ring 17, through a washer 25 of rubber or other elastomer, and through a central opening provided in an umbrella disk or shield 26 which overlies the washer 25 as well as the central reinforcing rings 17. The upper screw-threaded portion 22b receives nuts 27. By reason of the fact that the square shank portion is held against rotation, the nuts may be axially adjusted without the need of holding the shank of the bolt with a separate tool.

The tensioning means utilized between the upper partition 15 and upper screen 14 is identical to the tensioning means utilized between the partition 12 and bottom screen 13, except that in place of the mounting strap 19 and mounting plate 20 a pair of cross straps 28 is provided. The central portions of the cross straps have registering square holes, and thus form mounting plate portions. The cross straps bridge the central opening 16 in the upper partition 15 and are suitably secured by conventional means to the partition. In this case the compression spring 24 is disposed below the cross straps 28.

Operation of the tensioning means is as follows:

During assembly or stacking of the shells 7, 8, and 9, the partiitons and screens are interposed in proper order, and the nuts 27 may be adjusted on the bolts 22 to exert an initial tension on the screens by depressing the centers of these screens. After the screens are assembled, the material to be screened is poured onto the center of the upper screen 14, and is caused to progress radially thereon by reason of the vibrations imparted by the motor 5 and eccentric weights 6. The material which does not pass the upper screen 14 is discharged through the upper spout 11.

The material passing to the upper screen 14 falls on the upper partition 15, and is deflected thereby through the central opening 16, onto the center of the bottom screen 13. Again the material progresses radially, the oversized passing out the second spout while the remaining material passes through the bottom screen onto the bottom partition 12 for discharge from the lowermost spout.

It will be noted that the umbrella disk 26 covers an area greater than the mounting strap 19 or the crossed portions of the straps 28 so that any material falling upon the umbrella disk and then passing through the surrounding screen does not fall in the region of the springs 24.

The flow of material around the protruding end of the bolts 21 and nuts 27 and over the umbrella disk 26 may produce some attrition, but this is negligible because the parts have substantial cross section. The spring 24 has substantially smaller cross section, and therefore if it were so exposed it would wear rapidly. Also material falling between the convolutions of the spring may be actually crushed therebetween by the adjacent coils causing additional spring wear. Still further, many materials tend to pack within the spring and interfere with its function.

In this regard it should be observed that the springs 24 are particularly applicable when it is desired to separate heated material or material which may vary in temperature. Thus as the screens become heated they stretch, and the springs expand to compensate. It is essential to feed the material to be screened onto the center of the screen. In previous constructions, the spring has been located above the screen, and under some conditions becomes packed with the material being separated. When this occurs, the spring cannot contract when the screen cools. This results in overstretching and loosening of the screen. If the screen becomes loose it is subject to extra wear.

In this regard it should be noted that in many cases it is not feasible to cover the upper end of the bolt and spring, should the spring be located above the screen, as the temperatures involved may be above that which would be tolerated by a rubber or elastomer cover, whereas a metal cover requires attachment by securing devices which might shake loose. By reason of the fact that the springs 24 of the present invention are located below the screens and within the area protected by the umbrella disks 26 they are not subjected to excessive wear.

It should also be observed that the heat may not be uniformly distributed on the screens so that their centers may be displaced laterally or may tend to tilt. It will be noted that the bolts are essentially, universally mounted, that is, pivotable about a point within the region of the hole through the mounting plate 20 or straps 28, so as to accommodate readily to any such distortion without requiring that the umbrella disk 26 or washer 25 be displaced relative to the reinforcing rings 17.

Still further, it should be noted that the partitions 12 and 15 are formed of sheet metal so that rigid mounting of screen tensioning bolts has in the past introduced serious problems. Welded connections between the tensioning bolt and sheet metal partitions have not withstood the vibration imposed. Also, it is difficult to position the fixed tension bolt accurately vertical, consequently the plane of the holddown washer, or the like, is canted, causing the center of the screen to slope, which not only prevents uniform screening action but introduces uneven stresses in the screen. These difficulties are eliminated due to the fact that the bolt 22 is universally mounted in the plate 20 or straps 28.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. The combination with a separator including a pair of circular shells and a normally flat circular screen interposed and clamped therebetween the screen defining a central aperture and said aperture having reinforced margins, of tensioning means for said screen, comprising:
   (a) a partition disposed under said screen in rigid relation to said shells;
   (b) a mounting means disposed centrally with respect to said partition and including a perforated mounting plate;
   (c) a compression spring disposed below said mounting plate;
   (d) an umbrella disk covering the central portion of said screen and the reinforced margins of said aperture;
   (e) a tension bolt having a head underlying said spring and a shaft extending upwardly through said spring, mounting plate, screen, and umbrella disk;
   (f) and screw-threaded means at the upper protruding end of said shaft for drawing upwardly on said bolt and depressing said screen, thereby to place said screen under tension and said spring under compression;
   (g) said umbrella disk preventing particles passing said screen from falling in the region of said mounting means, spring, and lower portion of the tension bolt.

2. A combination as set forth in claim 1, wherein:
   (a) said partition slopes upwardly from its periphery and is provided with a central opening, and said mounting means bridges said opening.

3. A combination as set forth in claim 1, wherein:
   (a) said partition slopes downwardly from its center toward said shells and said mounting means is removably secured above said partition.

4. The combination with a separator including a pair of circular shells and a normally flat circular screen interposed and clamped therebetween, the screen defining a central aperture and said aperture having reinforced margins, of tensioning means for said screen, comprising:
   (a) a partition disposed under said screen in rigid relation to said shells;
   (b) a mounting means secured to said partition under said screen and having a centrally disposed aperture;
   (c) a bolt extending through said aperture, and being slidably, tiltably, and nonrotatably connected with said mounting means;
   (d) a head at the lower end of said bolt below the aperture in said mounting means;
   (e) a compression spring interposed between said head and said mounting means;
   (f) an umbrella disk covering said screen aperture and reinforced margins thereof, and radially dimensioned to prevent particles passing said screen from falling in the region of said mounting means, spring, and lower portion of said tension bolt;
   (g) screw threads at the upper end of said bolt, said upper end projecting through said screen aperture and said umbrella disk;
   (h) and screw-threaded means at the upper protruding end of said shaft for drawing upwardly on said bolt and depressing said screen, thereby to place said screen under tension and said spring under compression.

5. A combination as set forth in claim 4, wherein:
   (a) said partition slopes upwardly from its periphery and is provided with a central opening, and said mounting means bridges said opening.

6. A combination as set forth in claim 4, wherein:
   (a) said partition slopes downwardly from its center toward said shells and said mounting means is removably secured above said partition.

References Cited in the file of this patent
UNITED STATES PATENTS

| | | |
|---|---|---|
| 1,722,792 | Gruender | July 30, 1929 |
| 2,714,961 | Miller | Aug. 9, 1955 |
| 2,808,152 | Kaufman | Oct. 1, 1957 |
| 3,011,639 | Holman | Dec. 5, 1961 |
| 3,035,700 | McCausland | May 22, 1962 |